> 3,667,909
> METHOD FOR THE PREPARATION OF ULTRA
> HIGH PURITY SiO₂ IN A POROUS BEAD FORM
> Ian M. Thomas, Temperance, Mich., assignor to
> Owens-Illinois, Inc.
> No Drawing. Filed Aug. 6, 1970, Ser. No. 61,843
> Int. Cl. C01b 33/00
> U.S. Cl. 23—182 R                    22 Claims

ABSTRACT OF THE DISCLOSURE

There is disclosed the preparation of high purity, silicon oxide in the form of porous beads of a high surface area by hydrolyzing a silicon alkoxide dissolved in a hydroxyl containing organic solvent with less than a stoichiometric amount of water so as to provide a partially hydrolyzed soluble intermediate product. The resulting partially hydrolyzed intermediate product is then treated with an immiscible organic medium so as to form a discontinuous phase of liquid partially hydrolyzed intermediate product dispersed in a continuous phase of organic medium. The dispersed intermediate product is then treated with a base and a quantity of water sufficient to hydrolyze residual alkoxy groups in the dispersed intermediate product. The resulting mixture is stirred until the dispersed intermediate is converted to firm, hard, solid, porous beads of silicon oxide. The beads are typically recovered by filtration and evaporation of non-solid residues or by like method.

---

This invention relates to the preparation of high purity, porous silicon oxide beads. More particularly, this invention relates to the preparation of homogeneous, ultra pure, solid, porous silicon oxide beads of high surface area by the steps of:

(I) hydrolyzing a silicon alkoxide dissolved in a polar solvent with a less than a stoichiometric quantity of water so as to prepare an intermediate product of partially hydrolyzed soluble silicon alkoxide;

(II) treating the product of step I with an immiscible organic medium so as to form a mixture comprising a discontinuous phase of liquid partially hydrolyzed intermediate product dispersed in a continuous phase of organic medium;

(III) adding a quantity of base to the mixture sufficient to adjust it to an alkaline pH and a quantity of water sufficient to hydrolyze residual alkoxy groups in the dispersed intermediate product;

(IV) stirring the mixture until the dispersed intermediate product is converted to firm, hard, porous, solid silicon oxide beads;

(V) and then recovering the beads from the mixture.

In accordance with the more specific practice of this invention, the hydrolysis of the silicon alkoxide in process step I is typically accomplished by reacting about 1 equivalent of a silicon alkoxide with about 0.3 to about 1.5 equivalent of water. Preferably the silicon alkoxide is hydrolyzed with about 0.9 to about 1 equivalent of water.

Likewise, such partial hydrolyzing of the silicon alkoxide is preferably accomplished with heat, e.g. up to about 60° C., in the presence of a suitable hydrolysis catalyst such as a mineral acid, e.g., HCl, or a Lewis Acid catalyst comprising compounds of a transitional element such as Zr or Ti or compounds of a non-transitional element such as Al.

The hydrolysis catalyst is used in a catalytic amount, generally about 1 to about 500 parts by weight per million parts by weight of silicon alkoxide.

The silicon alkoxide is selected from compounds of the formula $SiX_n y_{4-n}$ wherein X is hydrogen, phenyl, or alkyls of 1 to 6 carbons; $y$ is OR where R is an alkyl of 1 to 6 carbons; and $n$ is 0, 1, or 2.

The silicon alkoxide is dissolved in any suitable polar solvent, typically hydroxyl containing organic solvents such as lower aliphatic alcohols containing less than ten carbon atoms, e.g., methyl alcohol, ethyl alcohol, isopropyl alcohol, etc.

In process step II, the immiscible organic medium is typically a non-polar solvent such as hexane, heptane, octane, nonane, benzene, toluene, carbon tetrachloride.

In process step III, the mixture is adjusted to an alkaline pH range by any suitable organic or inorganic base. However, where a particular contamination such as alkali is undesirable, various bases will be avoided; e.g., the alkali bases such as NaOH, KOH, etc. Typical bases used in this invention include ammonia, ammonium hydroxide, and the organic amines, especially the alkylamines such as triethylamine.

In one highly preferred embodiment of this invention, a non-ionic emulsifier or surfactant is added to the mixture prior to the pH adjustment so as to enhance the uniformity of the subsequently formed solid, porous beads. Typical nonionic surfactants include morpholine oleate, polyglycol fatty acid esters, diethylene glycol mono-stearate, ethylene oxide condensates of amides, akylaryl polyether alcohols.

In step IV, vigorous stirring is usually preferred. Typically the solid, porous beads begin to form within 5 to 60 minutes and are hard within another 60 minutes.

The recovery of the beads in step V may be by any convenient means. Typically the beads are filtered off and then heated slowly to an elevated temperature, e.g. up to about 500° C., to evaporate or thermally decompose any organic residues and to dehydrate the product.

The silica beads prepared by this invention are in the form of ultra pure, hard, firm, solid, porous, crystal clear, spherical beads varying in size from about 50 microns to about 500 microns with a B.E.T. surface area of about 500 to about 900 square meters per gram. The B.E.T. surface area measurement utilized krypton as the absorbing gas. B.E.T. refers to the Brunauer-Emmett-Teller surface area measuring method described in the Journal of the American Chemical Society, vol. 60, p. 309 (1938).

In accordance with the practice of the invention at bar, it has been further discovered that high purity, homogeneous, silicon oxide beads can be prepared which contain less than 50 p.p.m. by weight, typically less than 10 p.p.m., of trace metal impurities such as alkali metal oxides.

The following example is intended to illustrate one of the best embodiments contemplated by the inventor in the practice of this invention.

EXAMPLE

Distilled ethyl silicate (208 grams:1.0 mole) was dissolved in ethanol (150 ml.). Water (18 grams:1.0 mole) and a catalytic amount of 1 N mineral acid (0.2 gram: approx. 20 p.p.m. by weight acid) were then added to the ethyl silicate-ethanol solution. The resulting clear solution was then heated slowly to about 60° C. for 10 to 15 minutes so as to provide a partially hydrolyzed but soluble organosilicate in ethanol solution.

The solution was cooled to room temperature and a nonpolar organic medium (heptane) added. The solution became a two-phase mixture of small partially hydrolyzed organosilicate liquids dispersed in a heptane medium. A further 1.0 mole of water was added and a sufficient quantity of triethylamine was added to adjust the mixture pH to an alkaline range.

The mixture was stirred vigorously for about 30 minutes and solid beads began to form. Within 60 more minutes the beads had hardened.

The resulting beads were filtered off and heated slowly to 500° C. to remove organic residues and to dehydrate the product. A quantitative yield of $SiO_2$ was obtained in the form of crystal clear, spherical beads varying in size from about 50 microns to 500 microns. The surface area (B.E.T. method was 500–700 square meters per gram.

An emission spectrographic analysis of the resulting material gave the following results in p.p.m. (parts per million by weight);

| | P.p.m. |
|---|---|
| Fe | 0.9 |
| Mg. | 1.1 |
| Al | 2.2 |
| Ca | 2.0 |
| Ti | 0.5 |
| Na | 0.5–5.0 |
| Li | 0.1–1.0 |
| K | 0.4–4.0 |
| Rb | <0.2 |
| Ba | <0.8 |
| Be | <0.2 |
| Mn | <0.2 |
| Sb | <1.5 |
| Pb | <0.4 |
| Cr | <0.2 |
| As | <5.0 |
| Ni | <0.2 |
| Mo | <0.2 |
| Cu | <2.0 |
| Zn | <2.0 |
| Zr | <0.2 |
| Sn | <0.2 |

The foregoing spectrographic results illustrate the product high purity obtained by the practice of this invention. X-ray analysis indicated that the product was amorphous.

I claim:

1. A process for preparing high purity, amorphous, solid silicon oxide beads of a high surface area which comprises:

(I) hydrolyzing a silicon alkoxide dissolved in a polar solvent with less than a stoichiometric quantity of water so as to prepare a soluble intermediate product of partially hydrolyzed silicon alkoxide, said silicon alkoxide being selected from compounds of the formula $SiX_nY_{4-n}$ wherein X is hydrogen, phenyl, or alkyls of 1 to 6 carbons; Y is OR where R is an alkyl of 1 to 6 carbons; and $n$ is 0, 1, or 2;

(II) treating the product of Step I with an immiscible organic medium so as to form a mixture comprising a discontinuous phase of liquid partially hydrolyzed intermediate product dispersed in a continuous phase of organic medium;

(III) adding a quantity of base to the mixture sufficient to adjust it to an alkaline pH and an additional quantity of water sufficient to hydrolyze residual alkoxy groups in the dispersed intermediate product;

(IV) stirring the mixture until the dispersed intermediate product is converted to firm, hard, solid, porous silicon oxide beads;

(V) and then recovering the beads from the mixture.

2. The process of claim 1 wherein the silicon alkoxide is hydrolyzed with about .3 to about 1.5 equivalent of water per equivalent of silicon alkoxide.

3. The process of claim 2 wherein the silicon alkoxide is hydrolyzed with about 0.9 equivalent of water per equivalent of silicon alkoxide.

4. The process of claim 2 wherein the silicon alkoxide is hydrolyzed in Step I in the presence of a catalytic amount of a hydrolysis catalyst.

5. The process of claim 4 wherein the hydrolysis catalyst is a mineral acid.

6. The process of claim 5 wherein the mineral acid is hydrochloric acid.

7. The process of claim 4 wherein the catalytic amount of hydrolysis catalyst is between about 1 and about 500 parts by weight per million parts by weight of silicon alkoxide.

8. The process of claim 4 wherein the hydrolysis catalyst is a Lewis Acid catalyst.

9. The process of claim 8 wherein the Lewis Acid catalyst comprises compounds of a transitional element consisting of Zr or Ti.

10. The process of claim 8 wherein the Lewis Acid catalyst comprises compounds of the non-transitional element Al.

11. The process of claim 1 wherein said polar solvent for said silicon alkoxide is a hydroxyl containing organic solvent.

12. A process according to claim 11 wherein said hydroxy containing organic solvent is a lower aliphatic alcohol containing less than 10 carbon atoms.

13. The process of claim 1 wherein the silicon alkoxide is tetraethylorthosilicate.

14. The process of claim 1 wherein the silicon alkoxide is tetramethylsilicate.

15. The process of claim 1 wherein organic medium in Step II is a non-polar solvent.

16. The process of claim 15 wherein the base in Step III is selected from ammonia, ammonium hydroxide, and organic amines.

17. The process of claim 15 wherein said non-polar solvent is hexane, heptane, octane, nonan, benzene, toluene, or carbon tetrachloride.

18. The process of claim 16 wherein a non-ionic emulsifier is added to the mixture prior to the pH adjustment so as to enhance the uniformity of the subsequently formed solid, porous beads.

19. The process of claim 16 wherein said organic amines comprise alkylamines.

20. The process of claim 18 wherein said non-ionic emulsifier is morpholine oleate, polyglycol, fatty acid esters diethylene glycol monostearate, ethylene oxide condensates of amides or alkylaryl polyether alcohols.

21. The process of claim 19 wherein said alkylamines include triethylamine.

22. The process of claim 1 wherein the silicon alkoxide is hydrolyzed in Step I at a temperature up to about 60° C.

References Cited

UNITED STATES PATENTS

| | | | |
|---|---|---|---|
| 1,909,008 | 5/1933 | Prange | 23—182 X |
| 2,027,932 | 1/1936 | Ray | 23—182 X |
| 3,554,698 | 1/1971 | Burzynski et al. | 23—182 R |
| 3,556,725 | 1/1971 | Chiola et al. | 23—182 R |
| 3,321,276 | 5/1967 | Burzynski et al. | 23—182 R |
| 3,243,262 | 3/1966 | Carr et al. | 23—182 R |
| 3,328,125 | 6/1967 | Mays et al. | 23—182 R |

HERBERT T. CARTER, Primary Examiner